United States Patent
Halvarsson et al.

[11] Patent Number: 5,828,875
[45] Date of Patent: Oct. 27, 1998

[54] UNROLL OF INSTRUCTIONS IN A MICRO-CONTROLLER

[75] Inventors: Dan Olov Halvarsson, Stockholm; Lars-Erik Lundström, Ronninge; Tomas Lars Jonsson, Södertäalje; Tobias Carl Roos, Lidingö, all of Sweden

[73] Assignee: Telefonaktiebolaget LM Ericsson, Stockholm, Sweden

[21] Appl. No.: 864,888

[22] Filed: May 29, 1997

[51] Int. Cl.$^6$ .................................................. G06F 9/30
[52] U.S. Cl. ............................................................ 395/588
[58] Field of Search ................................. 395/588, 705

[56] References Cited

U.S. PATENT DOCUMENTS

| | | | |
|---|---|---|---|
| 4,097,920 | 6/1978 | Ozga | 395/588 |
| 4,792,892 | 12/1988 | LucMary et al. | 395/588 |
| 4,858,115 | 8/1989 | Rusterholz et al. | 395/800.07 |
| 5,038,282 | 8/1991 | Gilbert et al. | 395/800.14 |
| 5,121,498 | 6/1992 | Gilbert et al. | 395/708 |
| 5,265,253 | 11/1993 | Yamada | 395/709 |
| 5,303,355 | 4/1994 | Gergen et al. | 395/588 |
| 5,375,238 | 12/1994 | Ooi | 395/588 |
| 5,507,027 | 4/1996 | Kawamoto | 395/588 |
| 5,579,493 | 11/1996 | Kiuchi et al. | 395/383 |
| 5,657,485 | 8/1997 | Streitenberger et al. | 395/595 |
| 5,680,600 | 10/1997 | Childers et al. | 395/595 |
| 5,727,194 | 3/1998 | Shridhar et al. | 395/588 |

*Primary Examiner*—William M. Treat
*Attorney, Agent, or Firm*—Burns, Doane, Swecker & Mathis, L.L.P.

[57] ABSTRACT

Loops in program code are avoided by generating instructions for controlling a processor. A first template instruction is stored, and a predetermined number of instructions may be generated, wherein each generated instruction is based on the first template instruction. The processor may be alternatively supplied with the generated instructions or with instructions received from an alternative instruction source. A substitute address field may be stored, and the step of generating each instruction may include substituting the substitute address field in place of an address field in the first template instruction. The stored substitute address field may be adjusted after generating each instruction. The step substituting the substitute address field in place of an address field in the first template instruction may be performed only if a substitution control signal is asserted. In another embodiment, first and second template instructions are stored, and each is used as a basis for generating a repeating sequence of instructions, including first and second instructions.

30 Claims, 12 Drawing Sheets

UNROLL OF INSTRUCTIONS IN A MICROCONTROLLER

BACKGROUND

The present invention relates to execution of instructions in a processor, and more particularly to apparatus and methods for increasing execution speed in a programmable processor by avoiding the occurrence of instruction branching within programs and micro-programs.

It is known that one way of improving overall instruction execution speed of a programmable processor is to prefetch the instructions before they are needed for execution, and to store them in a local memory device from which they will be retrieved when needed. Another known technique for speeding overall instruction execution speed is to use pipelined instruction execution, in which the execution of each instruction is divided up into a series of sequential steps. This permits a higher utilization of hardware resources in the processor, because during the time allotted to each step, any resources not being used by a first instruction may be utilized for performing one of the steps of a subsequent instruction. Consequently, overall instruction throughput is higher than it would be if each instruction could not begin any part of its execution until a preceding instruction had entirely completed its execution.

One requirement for maintaining the optimum throughput in such a processor is that the flow of instructions not be interrupted, because this can require that time be expended refilling the pipeline. However, it is common in conventional microprogrammed systems for breaks in the flow of execution to occur as a result of the execution of jump instructions occurring in the microcode. As a result, conventional systems do not always make optimal use of their hardware resources, and therefore do not operate at their highest possible throughput rates.

Although the occurrence of Jump instructions appears to be the cause of the above-described problem, one cannot avoid the problem simply by resolving not to include jump instructions in programs. This is because jump instructions, such as conditional branches, are often necessary for effecting a desired program result. Furthermore, even if some sections of a program or microprogram could theoretically be written as "straight line" code without any jumps (e.g., by replicating code segments that would otherwise constitute a loop of instructions), this approach substantially increases the size that the program will occupy in memory. In systems having memory limitations, this increased program size would be unacceptable.

It is therefore desirable to provide techniques and apparatus that are able to avoid breaks in program execution due to jumps, while still permitting such programs to be written in an efficient and compact manner.

SUMMARY

In accordance with one aspect of the present invention, the foregoing and other objects are achieved in methods and apparatus for generating instructions for controlling a processor. In one aspect of the invention, a first template instruction is stored, and a generating apparatus is used to generate a predetermined number of instructions, wherein each generated instruction is based on the first template instruction.

In another aspect of the invention, the generated instructions are supplied to the processor when the generating apparatus is activated, and instructions received from an alternative instruction source are supplied to the processor when the generating apparatus is not activated.

In yet another aspect of the invention, a substitute address field is stored, and the step of generating each instruction includes substituting the substitute address field in place of an address field in the first template instruction.

In still another aspect of the invention, the stored substitute address field is adjusted (e.g., incremented or decremented) after generating each instruction.

In another aspect of the invention, the step of generating each instruction includes substituting the substitute address field in place of an address field in the first template instruction only if a substitution control signal is asserted.

In another embodiment, a first template instruction is stored, and a second template instruction is stored. A generating apparatus is used to generate a number of instructions including a first instruction based on the first template instruction and a second instruction based on the second template instruction. The generating apparatus is repeatedly operated until a predetermined number of instructions have been generated.

In another aspect of this embodiment, a first substitution control signal is stored, and the generating apparatus substitutes the substitute address field in place of an address field in the first template instruction only if the first substitution control signal is asserted.

In yet another aspect of the invention, the generating apparatus generates each second instruction by substituting the substitute address field in place of an address field in the second template instruction.

In still another aspect of the invention, the stored substitute address field is adjusted (e.g., incremented or decremented) after generating each first instruction and after generating each second instruction.

In yet another aspect of the invention, first and second substitution control signals are stored. Here, the generating apparatus substitutes the substitute address field in place of an address field in the first template instruction only if the first substitution control signal is asserted, and substitutes the substitute address field in place of an address field in the second template instruction only if the second substitution control signal is asserted.

BRIEF DESCRIPTION OF THE DRAWINGS

The objects and advantages of the invention will be understood by reading the following detailed description in conjunction with the drawings in which.

DETAILED DESCRIPTION

Figure 1:
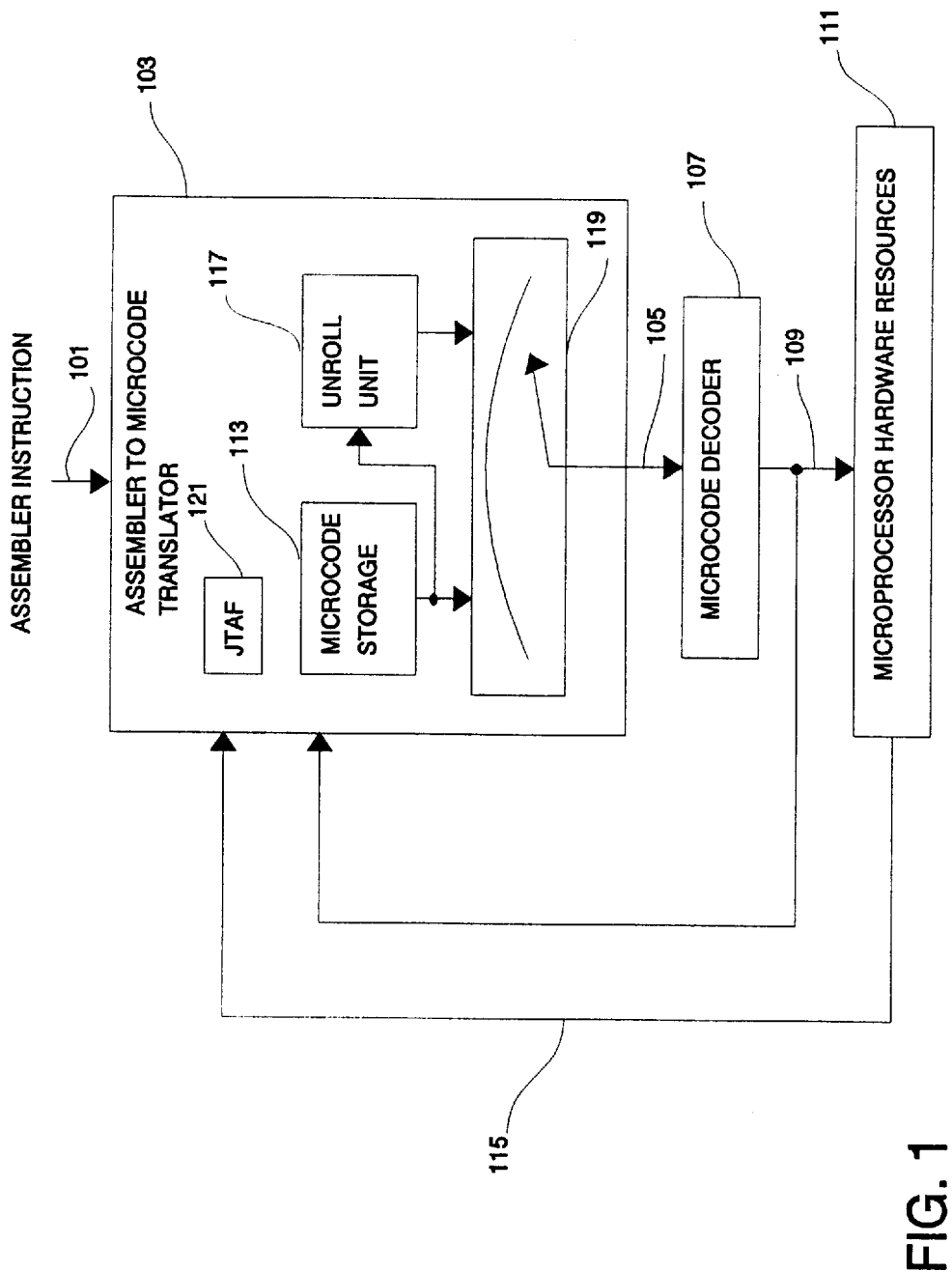
FIG. 1 is a block diagram showing the pertinent components of a microprogrammed processor in accordance with an embodiment of the invention.

The various features of the invention will now be described with respect to the figures, in which like parts are identified with the same reference characters.

The invention is embodied in an apparatus and techniques for dynamically generating a sequence of program instructions that would otherwise have been coded as a loop (i.e., a code segment including one or more conditional branch instructions that cause execution of the loop to be repeated until a condition is satisfied). In the following description, the invention is applied to eliminating loops that would otherwise occur in the microcode that interprets assembly language instructions in a microprogrammed architecture. However, those having ordinary skill in the art will recognize that the inventive techniques described herein may readily applied to eliminating program loops in other types of processor architectures at levels that may or may not be characterized as a microprogramming level.

Referring to FIG. 1, the pertinent components of a microprogrammed processor are shown. The architecture that is presented to the programmer is one that is controlled by a series of assembly language instructions. However, each assembly language instruction 101 is actually translated by an assembler to microcode translator 103 into a sequence of one or more microinstructions 105. Each microinstruction is converted into a sequence of control signals 109 by a microcode decoder 107. The control signals 109 determine the operation of the various microprocessor hardware resources 111. Such resources may include such components as an arithmetic logic unit (ALU), assembly language program counter, address registers, status registers, and various addressable data registers. This list is by no means intended to be exhaustive, but merely illustrative of the types of well-known processor-related components that might be included in the microprocessor hardware resources 111. The design and selection of such components to effect useful processor architectures is well-known, and is therefore not described here in detail.

The set of microinstructions for emulating the processor architecture seen by the programmer is stored in an addressable microcode storage unit 113, which may be, for example, a read only memory (ROM), or other suitable memory device. For convenience, the microcode storage unit 113 is shown to be part of the assembler to microcode translator 103. It will be recognized, however, that the processor need not be physically embodied in this manner.

Part of the operation of the assembler to microcode translator 103 is to determine a microaddress for retrieving a next microinstruction from the microcode storage unit 113. In some instances, this microaddress may be based, in part, on an operation code (not shown) that is included in one field of an assembler instruction 101. A next microaddress address may also be a function of one or more fields in a presently executed microinstruction. Thus, it is useful to provide a feedback path of at least some of the control signals 109 back to the assembler to microcode translator 103 in order to facilitate microinstruction address generation. Because it is often desirable to specify a next microaddress as a function of one or more conditions that are present within the microprocessor hardware resources 111, it is further useful to provide a feedback path 115 to the assembler to microcode translator. Such conditions may include, for example, whether an overflow condition has been generated by an ALU in the microprocessor hardware resources 111, whether a "1" has been shifted out of a shift register, whether a zero-result has been generated at the ALU output, and the like. Again, this list is merely intended to be illustrative, and is not to be construed as exhaustive.

It is often the case that a particular assembler instruction 101 will designate a same operation to be repeated for a set number of times and/or for a range of source and/or destination addresses. In conventional processors, this would require that one or more microinstructions be written as a loop that includes a branch back to a loop entry point. As explained in the BACKGROUND section of this disclosure, this branching within the microcode can be detrimental to processor performance. For example, although it is not illustrated in FIG. 1 (for the sake of simplicity), the architecture of the processor may include an execution pipeline that allows parts of microinstructions to be executed in parallel, thereby making more efficient use of the microprocessor hardware resources 111. Any branch operation in the pipeline can cause the pipeline to have to be reloaded. Since the processor cannot perform useful work (i.e., useful from the point of view of producing tangible results in connection with assembler instructions) during the time interval that it takes to reload the pipeline, the overall throughput of the processor is reduced whenever a loop of microinstructions is to be repeated.

In accordance with one aspect of the invention, this problem is eliminated by the inclusion of an unroll unit 117 in the assembler to microcode translator 103. The unroll unit 117 dynamically generates a sequence of microinstructions that cause the microprocessor hardware resources 111 to execute a desired operation that would otherwise have been implemented by a microcode loop. A multiplexer 119 is also provided, having one input coupled to the output of the microcode storage unit 113, and another input coupled to the output of the unroll unit 117. The output of the multiplexer 119 supplies microinstructions to the microcode decoder 107. When the unroll unit 117 is activated, the multiplexer 119 is controlled so that the output of the unroll unit 117 will appear at the output of the multiplexer 119. When the unroll unit 117 is not active, the multiplexer 119 is controlled to route the output of the microcode storage unit 113 to the microcode decoder 107.

The sequence of microinstructions generated by the unroll unit 117 is characterized by the fact that it does not include any loops. Rather, the sequence of microinstructions will continue to be generated and executed until either a predetermined number of microinstructions has been generated, or alternatively until a predetermined condition is satisfied. Because loops are eliminated, even if the architecture of the processor includes a microinstruction pipeline or other microinstruction queuing mechanism, the need for reloading the pipeline or queue as a result of a microinstruction branch back to a loop entry point will be avoided.

Figure 2:
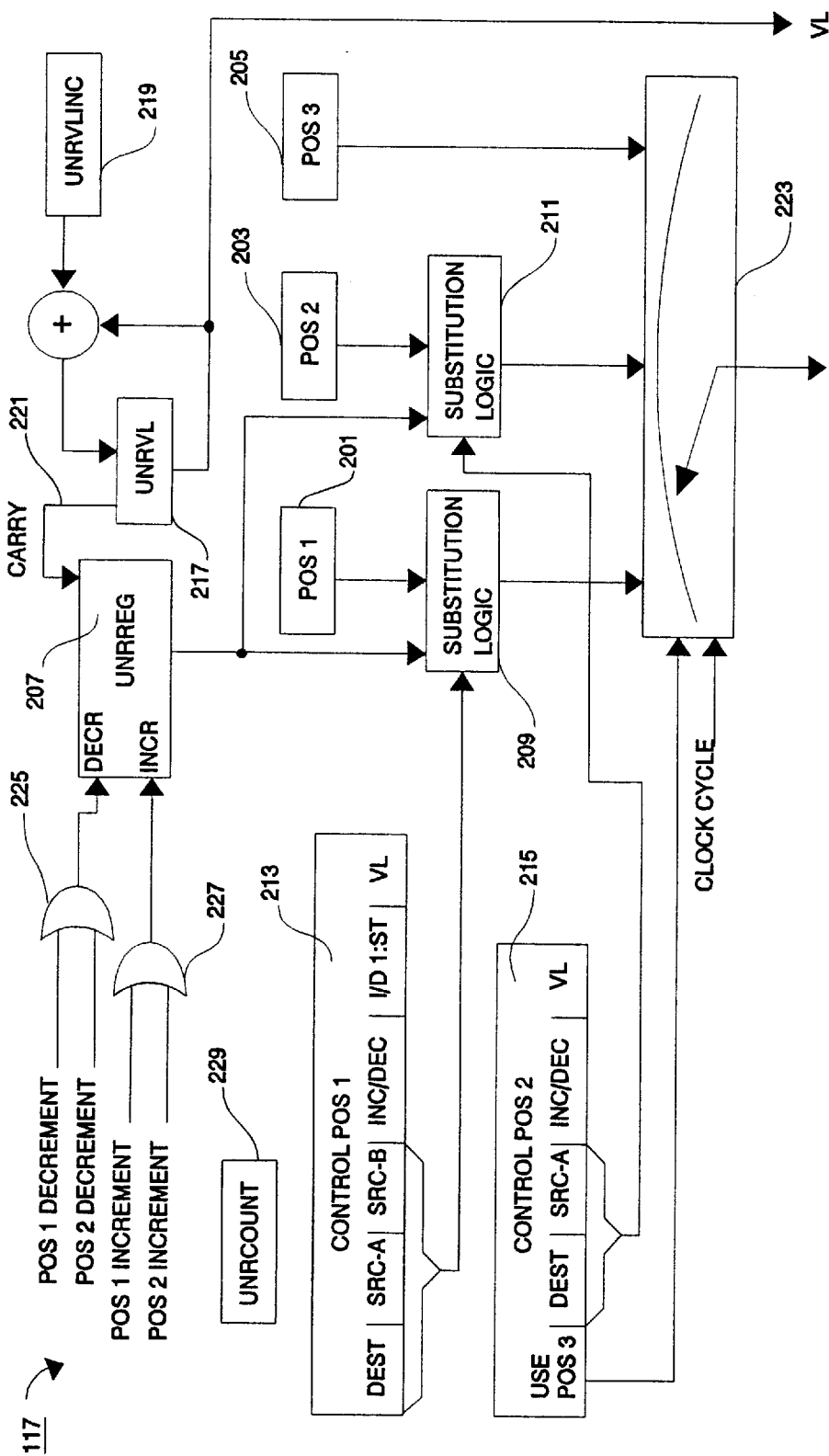
FIG. 2 is a block diagram of an embodiment of an unroll unit in accordance with the invention.

The various aspects of the unroll techniques will now be described in greater detail in connection with an embodiment of an unroll unit 117 illustrated in FIG. 2. The unroll unit 117 includes three registers, the contents of which may be used as a basis for generating up to three different microinstruction words to be supplied to the by the unroll unit 117 to the multiplexer 119. The three registers are the POS 1 register 201, the POS 2 register 203 and the POS 3 register 205.

Microinstructions typically include one or more fields for designating one of a plurality of addressable sources and/or destinations. In the exemplary embodiment, the microprocessor hardware resources 111 include a bank of addressable registers, and each microinstruction may designate one of the registers (a "destination register") for receiving a data item, and up to two of the registers ("source registers") for supplying data items to be used during a specified microoperation. The two microinstruction fields for designating source registers are herein referred to as SrcA and SrcB fields. The microinstruction field for designating a destination register is herein referred to as a Dest field.

To enable a sequence of microinstructions to be generated that will operate over a sequence of various source and/or destination registers, the unroll unit 117 further includes an unroll register, herein designated UNRREG 207. The UNRREG 207 is initialized with a starting register address. The data appearing at the output of the UNRREG 207 may be inserted into any of the SrcA, SrcB and Dest fields of any microinstructions based on the contents of the POS 1 register 201 or the POS 2 register 203. The substitution of the UNRREG 207 value for the value actually appearing in a field stored in the POS 1 register 201 or the POS 2 register 203 is performed by POS 1 substitution logic 209 and the POS 2 substitution logic 211, respectively, under the control of bits stored in a POS 1 control register 213 and a POS 2 control register 215, respectively.

In the exemplary embodiment, there is no substitution logic provided for the POS 3 register 205, so the contents of this register may not be altered whenever they are inserted into the generated sequence of microinstructions. Of course, such substitution logic may be provided in alternative embodiments, should such inclusion be beneficial for the particular processor architecture under consideration.

The UNRREG 207 is preferably a counter register, capable of being incremented or decremented. This feature allows a stream of microinstructions to be generated that will utilize a sequence of registers in performing a repeated operation. Incrementing the UNRREG 207 is controlled by signals designated POS 1 INCREMENT and POS 2 INCREMENT. Decrementing the UNRREG 207 is controlled by signals designated POS 1 DECREMENT and POS 2 DECREMENT. When none of these signals is asserted, the UNRREG 207 is left unchanged (unless a CARRY bit 221 is added to the least significant bit of the UNRREG 207, as will be explained in detail below). The generation of these signals will be described in greater detail below. In practice, the UNRREG 207 may be incremented or decremented after a microinstruction is generated based on either the POS 1 register 201 or the POS 2 register 203. This allows a next generated microinstruction to address a different source and/or destination field.

As mentioned above, the substitution of the UNRREG 207 value for the value actually appearing in a source and/or destination field stored in the POS 1 register 201 or the POS 2 register 203 is performed by POS 1 substitution logic 209 and the POS 2 substitution logic 211, respectively, under the control of bits stored in a POS 1 control register 213 and a POS 2 control register 215, respectively. In particular, the exemplary POS 1 control register 213 is a 6-bit wide register. Three of the bits are designated DEST, SRC-A and SRC-B. Asserting any of these bits (e.g., setting any of these bits equal to a "1") causes the POS 1 substitution logic 209 to replace the corresponding field (i.e., Dest, SrcA, SrcB) from the output of the POS 1 register 201 with the contents of the UNRREG 207. The remaining fields in the POS 1 control register 213 will be described below.

The exemplary POS 2 control register 215 is a 5-bit wide register, including two bits designated DEST and SRC-A. Asserting any of these bits (e.g., setting any of these bits equal to a "1") causes the POS 2 substitution logic 211 to replace the corresponding field (i.e., Dest, SrcA) from the output of the POS 2 register 203 with the contents of the UNRREG 207. The remaining fields in the POS 2 control register 215 will be described below. It is noted that the decision not to include a SRC-B control bit in the POS 2 control register 215 is merely a design choice, and is not compelled by any aspect of the invention. To the contrary, alternative embodiments of the invention could easily provide the capability for substituting the contents of the UNRREG 207 for a SrcB field in the output of the POS 2 register 203.

Each of the POS 1 and POS 2 control registers, 213 and 215, includes a bit designated INC/DEC. The INC/DEC bit controls whether the UNRREG 207 will be incremented or alternatively decremented after generation of a microinstruction that utilized the contents of the UNRREG 207. This will be described in greater detail below.

When a desired source or destination operand is the same size as a register in which it is (or is to be) contained (e.g., a 32-bit operand contained in a 32-bit wide register), the above-described addressing strategy works. However, it is not uncommon for some microinstructions to work on operands that are smaller than the register in which they are contained (e.g., an 8-bit operand contained in a 32-bit wide register). In such cases, one register may contain several of these smaller operands, thereby creating the need for a finer level of operand addressability. The UNRVL register 217 serves this purpose. In the exemplary embodiment, the UNRVL register 217 is five bits wide, which, when concatenated with a Dest, SrcA or SrcB field of a generated microinstruction, permits any of thirty-two bits within an addressed register to be specified. When a microinstruction is generated by either the POS 1 substitution logic 209 or the POS 2 substitution logic 211, which generated microinstruction utilizes this finer granularity (e.g., bit-level) of addressing, it is not desirable to always increment or decrement the UNRREG 207 as described above, because the next microinstruction to be generated may need to address a different set of bits within the same register.

In another aspect of the invention, this problem is solved by providing a bit, designated VL (for "variable length"), in each of the POS 1 and POS 2 control registers, 213 and 215. Asserting (e.g., setting to a logic "1") the VL bit in either of the POS 1 or POS 2 control registers, and 215, disables the normal incrementing or decrementing of the UNRREG 207 after generation of a corresponding POS 1- or POS 2-related microinstruction. Instead, the UNRVL register 217 is adjusted by adding to it a value stored in an UNRVLINC register 219. The UNRREG 207 is, in turn, incremented whenever a CARRY bit 221 is generated as a result of the UNRVL register 217 adjustment operation.

Figure 3:
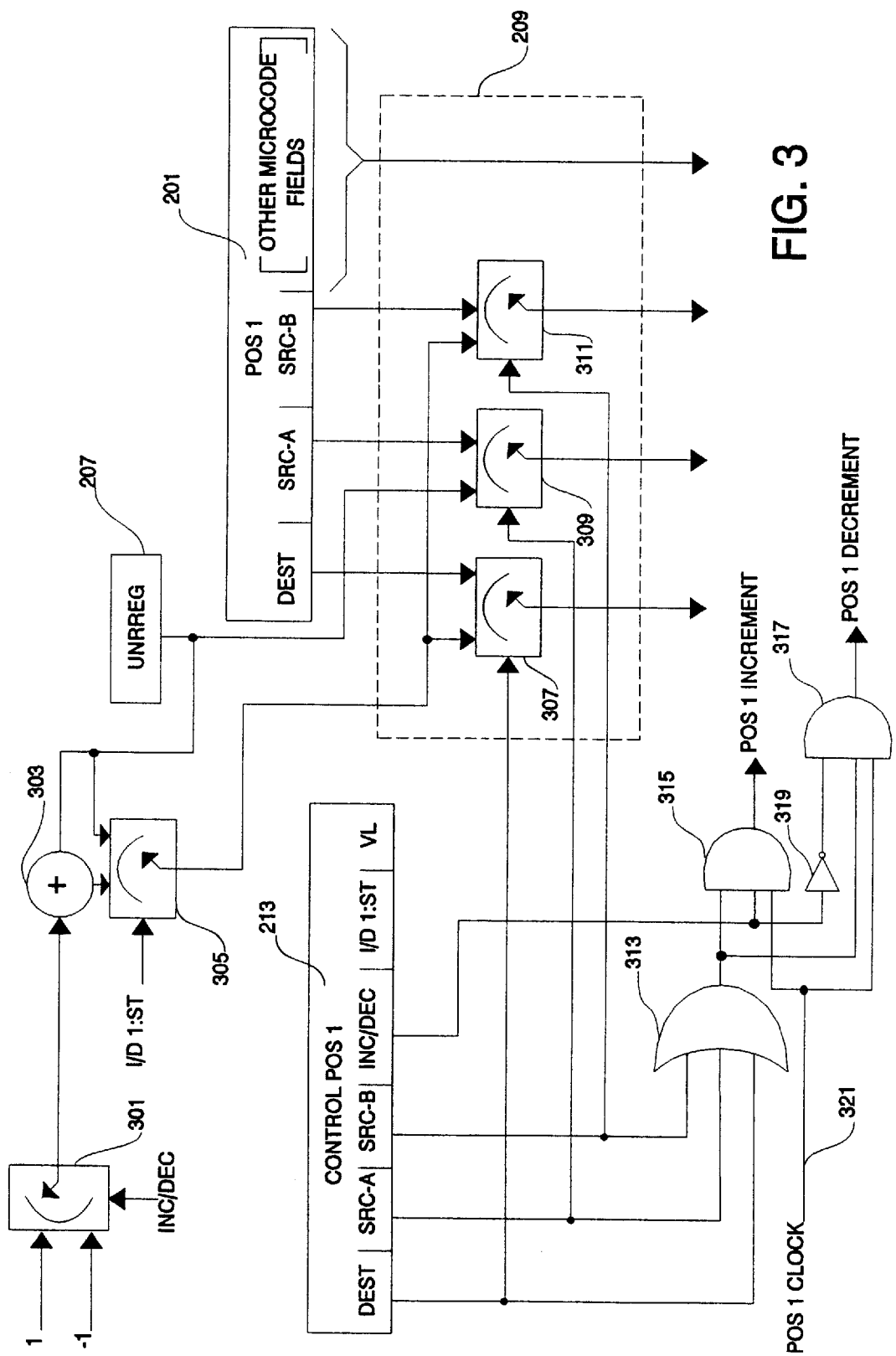
FIG. 3 is a block diagram showing, in greater detail, some components of the exemplary embodiment of the unroll unit in accordance with the invention.

As explained above, if the output of the UNRREG 207 has been used for generating a microinstruction, the UNRREG 207 is subsequently incremented or decremented. In some cases, however, it is desired to generate a microinstruction having a SrcA field that designates, say, a register x, and a SrcB or Dest field that designates a register x+1. Merely specifying the output of the UNRREG 207 to replace the desired fields (e.g., the SrcA and SrcB fields, or the SrcA and Dest fields) will not generate the desired microinstruction because the same value from the UNRREG 207 would be used for each of the substituted fields. In accordance with another aspect of the invention, the unroll unit 117 further includes elements and connections that enable a sequence of microinstructions, each specifying x and x+1 addresses, to be generated based on the contents of the POS 1 register 201, where the value of x is incremented or decremented for each microinstruction in the sequence. More particularly, as shown in FIG. 3, the output of the UNRREG 207 is coupled to one input of a SrcA substitution multiplexer 309, so that when the SRC-A bit in the POS 1 control register 213 is asserted, the output of the UNRREG 207 will replace the bits being emanated from the SRC-A field of the POS 1 register 201. The DEST and SRC-B fields of the POS 1 register 201 are not replaced in this manner however. Instead, each of the DEST and SRC-B fields of the POS 1 register 201 supply data to one input of a respective Dest and SrcB substitution multiplexer 307 and 311. The other (substitute) input of each of the Dest and SrcB substitution multiplexers 307 and 311 receives an output of an UNRREG multiplexer 305. One input of the UNRREG multiplexer 305 receives an unmodified output from the UNRREG 207, so when it is desired to substitute only a same value for one or more fields in a generated microinstruction, the contents of the UNRREG 207 may be passed through to the substitute inputs of any of the Dest and SrcB substitution multiplexers 307 and 311. In order to allow incremented or decremented versions of the UNRREG 207 contents to be passed to the substitute inputs of any of the Dest and SrcB substitution multiplexers 307 and 311, a second input of the UNRREG multiplexer 305 receives an output of a summing circuit 303. One input of the summing circuit 303 receives data from the output of the UNRREG 207. A second input of the summing circuit 303 receives an output from an increment/decrement multiplexer 301, whose two inputs are tied to constants 1 and −1, respectively. Selection of one of the inputs of the increment/decrement multiplexer 301 is controlled by the INC/DEC bit located in the POS 1 control register 213. Selection of whether the UNRREG multiplexer 305 will supply the unmodified or the adjusted value of the UNRREG 207 output is controlled by another bit, designated I/D 1:ST, in the POS 1 control register 213 (the abbreviation "I/D 1:ST" stands for "increment/decrement after first substitution"). Asserting the bit in the I/D 1:ST bit causes the UNRREG multiplexer 305 to supply the adjusted value of UNRREG 207 to the substitute inputs of the Dest and SrcB substitution multiplexers 307 and 311.

Figure 4:
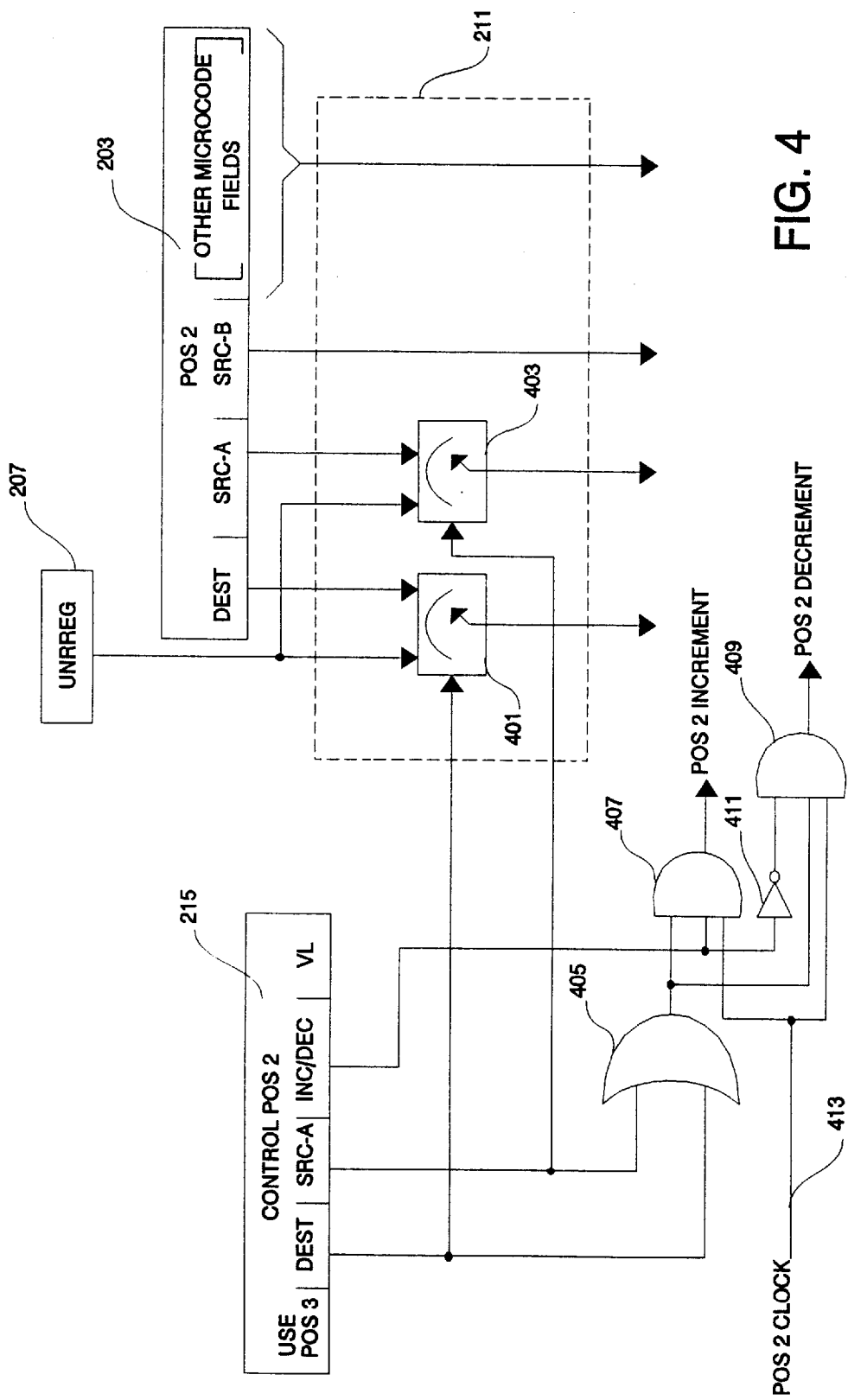
FIG. 4 is a block diagram showing, in greater detail, some components of the exemplary embodiment of the unroll unit in accordance with the invention.

In the illustrated embodiment, it is only possible to generate the sequence of microinstructions, each specifying x and x+1 addresses, based on the contents of the POS 1 register 201. As can be seen in FIG. 4, similar components and connections have not been supplied for generating similar sequences based on the contents of the POS 2 register 203. Instead, the POS 2 substitution logic includes a Dest substitution multiplexer 401 and a SrcA substitution multiplexer 403, each of which has a first input connected to receive an output from a respective one of the DEST and SRC-A fields of the POS 2 register 203, and a second (substitution) input coupled directly to the output of the UNRREG 207. However, this is merely a design choice, and is not mandated by any aspect of the invention. Specifically, it is possible in other embodiments to provide similar capabilities with respect to microinstructions that are based on the contents of the POS 2 register 203. Specifically, it is possible in other embodiments to provide the capability to generate microinstructions that are based on the contents of the POS 2 register 203, and which include one source or destination address of the form x, and another source or destination address of the form x+1 or x−1. It is further within the scope of the invention to provide similar capabilities for generating microinstructions having other variants of addresses within a single microinstruction.

Referring back to FIG. 2, the POS 2 control register further includes a bit, designated USE POS 3. Assertion of the USE POS 3 bit causes an unroll output multiplexer 223 to include the output of the POS 3 register 205 in its sequence of generated microinstructions. More specifically, when the USE POS 3 bit is asserted, the unroll output multiplexer 223 will successively select, with each next clock cycle, microinstructions based on outputs from the POS 1 register 201, the POS 2 register 203 and the POS 3 register 205 in a round robin fashion.

When the USE POS 3 bit is not asserted, the unroll output multiplexer 223 will cause a sequence of microinstructions to be generated based only on the contents of the POS 1 and POS 2 registers 201 and 203 (these two different types of microinstructions will alternate on a clock-by-clock basis).

In one embodiment of the invention, the microcode decoder 107 is capable of receiving and decoding up to two microinstructions in one clock cycle. In this case, the unroll unit 117 is designed so that, when the USE POS 3 bit in the POS 2 control register 215 is not asserted, two microinstructions (one based on the contents of the POS 1 register 201, and another based on the contents of the POS 2 register 203) are supplied at the output of the unroll unit 117 with each clock cycle. However, if an odd number of microinstructions were initially indicated in the UNRCOUNT register 229, then only one microinstruction is generated during the last cycle of unroll activation. If the USE POS 3 bit in the POS 2 control register 215 is asserted, the unroll unit 117 then alternates between supplying two microinstructions (one based on the contents of the POS 1 register 201, and another based on the contents of the POS 2 register 203) during a first clock cycle and then supplying a single microinstruction (based on the contents of the POS 3 register 205) during a second clock cycle, so that three microinstructions are generated every two clock cycles. In one embodiment, however, no POS 3 microinstruction is generated after the final POS 1 and POS 2 microinstructions are generated. Also in this embodiment, the UNRCOUNT register 229 is decremented once for every POS 1 or POS 2 microinstruction that is generated. However, it is not decremented for any POS 3 microinstructions that are generated. Accordingly, in this embodiment the UNRCOUNT register 229 must be initialized to designated only the desired number of POS 1- and POS 2-based instructions to be generated, without including the number of POS 3-based microinstructions to be generated.

It was mentioned above that whether the UNRREG 207 is incremented, decremented, or left unchanged (when the VL bit is not asserted) is controlled by a set of signals designated POS 1 DECREMENT, POS 2 DECREMENT, POS 1 INCREMENT, and POS 2 INCREMENT. In the exemplary embodiment, the POS 1 DECREMENT and POS 2 DECREMENT signals are logically OR'ed together by an OR gate 225, the output of which is supplied to a "Decrement" input of the UNRREG 207. Similarly, the POS 1 INCREMENT and POS 2 INCREMENT signals are logically OR'ed together by an OR gate 227, the output of which is supplied to an "Increment" input of the UNRREG 207. The generation of the POS 1 DECREMENT, POS 2 DECREMENT, POS 1 INCREMENT, and POS 2 INCREMENT signals will now be described in greater detail.

Referring first to FIG. 3, the DEST, SRC-A and SRC-B outputs of the POS 1 control register 213 are supplied to respective inputs of an OR gate 313, so that the output of the OR gate 313 will be asserted whenever any of the DEST, SRC-A and SRC-B bits are asserted. The output of the OR gate 313 is supplied to an input of each of a POS 1 increment AND gate 315, and a POS 1 decrement AND gate 317. A second input of the POS 1 increment AND gate 315 receives the output of the INC/DEC field of the POS 1 control register 213, since a increment is to occur when this bit is asserted. In order to generate a "decrement" control, the INC/DEC bit of the POS 1 control register 213 is inverted by an inverter 319, the output of which is supplied to a second input of the POS 1 decrement AND gate 317. To assure that each of the increment and decrement signals is asserted at a proper time, a third input of each of the POS 1 increment AND gate 315 and the POS 1 decrement AND gate 317 is coupled to receive a POS 1 clock signal 321. The output of the POS 1 increment AND gate 315 supplies the POS 1 INCREMENT signal, and the output of the POS 1 decrement AND gate 317 supplies the POS 1 DECREMENT signal.

The POS 2 INCREMENT and POS 2 DECREMENT signals are generated in a similar fashion. In particular, referring to FIG. 4, the DEST and SRC-A outputs of the POS 2 control register 215 are supplied to respective inputs of an OR gate 405, so that the output of the OR gate 405 will be asserted whenever either of the DEST and SRC-A bits are asserted. The output of the OR gate 405 is supplied to an input of each of a POS 2 increment AND gate 407, and a POS 2 decrement AND gate 409. A second input of the POS 2 increment AND gate 407 receives the output of the INC/DEC field of the POS 2 control register 215, since a increment is to occur when this bit is asserted. In order to generate a "decrement" control, the INC/DEC bit of the POS 2 control register 215 is inverted by an inverter 411, the output of which is supplied to a second input of the POS 2 decrement AND gate 409. To assure that each of the increment and decrement signals is asserted at a proper time, a third input of each of the POS 2 increment AND gate 407 and the POS 2 decrement AND gate 409 is coupled to receive a POS 2 clock signal 413. The output of the POS 2 increment AND gate 407 supplies the POS 2 INCREMENT signal, and the output of the POS 2 decrement AND gate 409 supplies the POS 2 DECREMENT signal.

The above description described the steady state operation of the unroll unit 117, that is, how the unroll unit 117 operates after it has been activated but before it has been deactivated. Aspects of the invention relating to activation of the unroll unit 117 and deactivation of the unroll unit 117 will now be described.

Activating the Unroll Function

Figure 5:
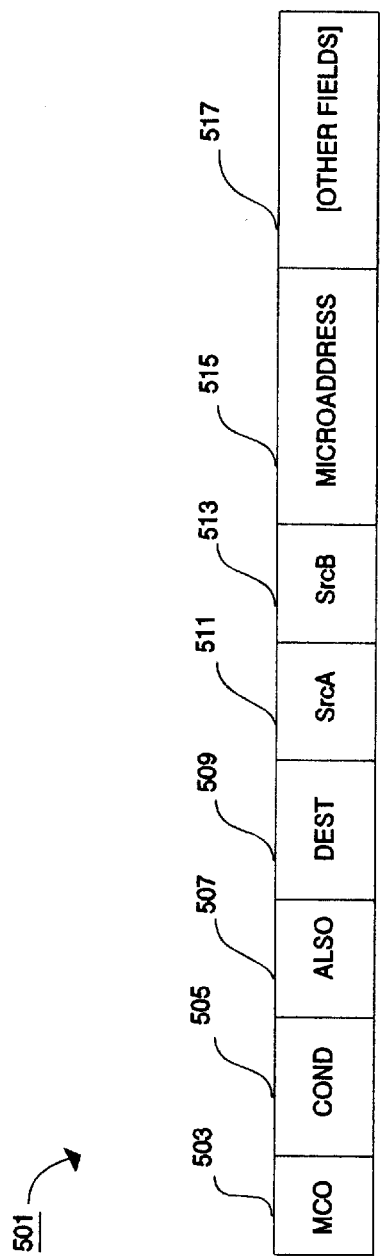
FIG. 5 illustrates an exemplary microinstruction format for use with the invention.

As stated above, when the unroll unit 117 is not activated, microinstructions are retrieved from the microcode storage unit 113, and executed by the microcode decoder 107. To facilitate an explanation of the invention, an exemplary microinstruction format is shown in FIG. 5. The exemplary microinstruction 501 includes a Micro Control Order (MCO) field 503, a Condition (Cond) field 505, an Arithmetic, Logic and Shift Operation (ALSO) field 507, a Destination (Dest) field 509, a Source-A (SrcA) field 511, a Source-B (SrcB) field 513, a microaddress field 515, and possible other fields 517. It will be recognized that the actual format and encoding of a microinstruction is intimately associated with the particular hardware that it is to control. These details, however, do not have a bearing on an understanding of the inventive principles described here. Consequently, some details relating to the exemplary microinstruction 501, such as the width and encoding of the various exemplary fields, are not described here. Furthermore, some embodiments of the invention may pertain to microinstructions having additional fields that are not defined here, and/or may pertain to microinstructions that omit one or more of the exemplary fields.

The purpose of each of the exemplary fields will now be briefly described. The MCO field 503 designates operations that affect the flow of control of microinstructions, such as various types of conditional and unconditional jump instructions. When a conditional jump is specified, the condition that is to be tested is specified by the Cond field 505. The microaddress that is the target of the jump is specified by the microaddress field 515. The ALSO field 507 designates which arithmetic, logic or shift operation is to be performed by hardware in the microprocessor hardware resources 111. The addresses of operands for the specified operation may be designated by the SrcA and SrcB fields 511, 513. If a result is to be stored, the destination address may be designated by the Dest field 509. Depending on what other resources and capabilities a given processor has, the microinstruction 501 may include other fields 517 for specifying other operations, addresses, immediate constants, and the like.

To activate the unroll function, the microprogrammer must code a particular sequence of microinstructions to be stored in the microcode storage unit 113. In the exemplary embodiment, each of the UNRREG 207, UNRVL register 217, UNRVLINC register 219, POS 1 control register 213, POS 2 control register 215, and POS 3 register 205 are directly addressable using normal microinstructions. Consequently, the microprogrammer must be sure that any of these registers that are to be used during a particular unroll activation are initialized to desired values. Initializing the POS 1 and POS 2 control registers 213 and 215 is mandatory, since these registers are used whenever the unroll unit 117 is activated. By contrast, any of the UNRREG 207, UNRVL register 217, UNRVLINC register 219, and POS 3 register 205 may not be used during an unroll activation, in which case they do not have to be initialized.

Another register that needs to be initialized prior to unroll activation is the UNRCOUNT register 229. In the exemplary embodiment, the contents of this register determine the maximum number of microinstructions that will be generated during this activation of the unroll unit 117, including any POS 3-based instructions to be generated. (As will be explained in detail below, it is possible that fewer than the maximum number of microinstructions will be generated before the unroll unit 117 is deactivated.) In the exemplary embodiment, writing a value to the UNRCOUNT register 229 sets a flag (not shown) that enables subsequent activation of the unroll unit 117. Whenever the unroll unit 117 is deactivated, this flag is reset. Consequently, it is always necessary to reinitialize the contents of the UNRCOUNT register 229 prior to activating the unroll unit 117. This is not true for the other unroll-related registers described above, which can be initialized once, and left alone for repeated activations of the unroll unit 117, if their contents already contain desired values.

Figure 6:
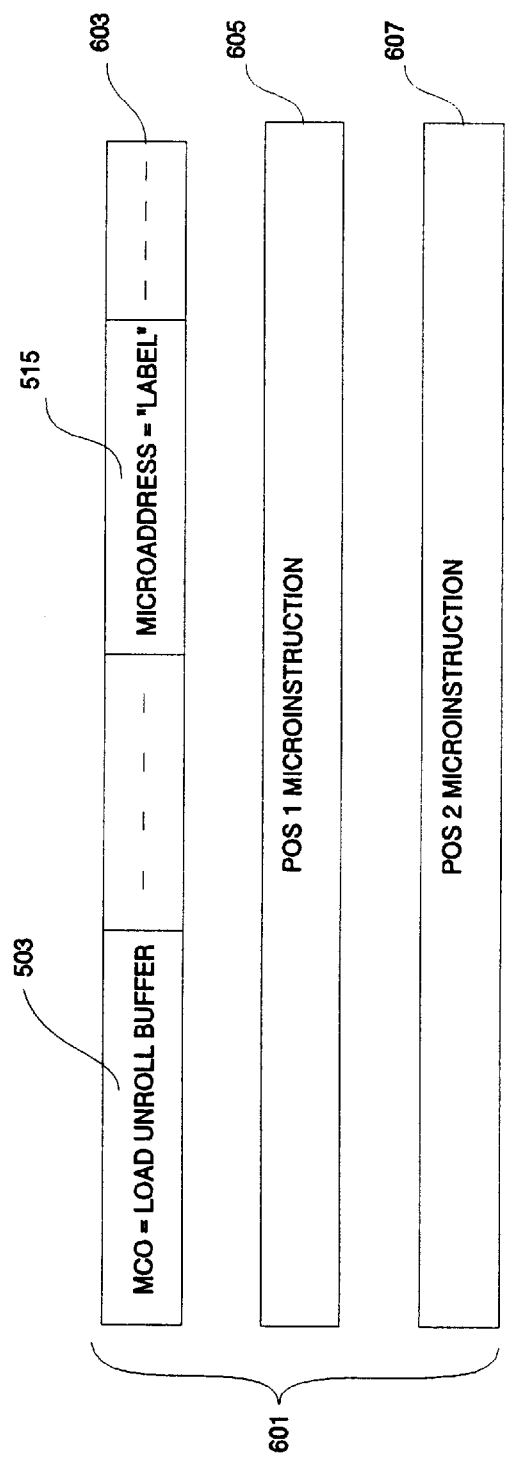
FIG. 6 illustrates a three word microinstruction format for activating an unroll unit in accordance with an embodiment of the invention.

After the above initialization has been performed, the unroll function is started by including, in the microcode sequence to be executed out of the microcode storage unit 113, a three word microinstruction 601, as shown in FIG. 6. The first word 603 of the microinstruction 601 has its MCO field 503 set to indicate a "Load Unroll Buffer" operation. This tells the microcode decoder 107 that this is the three word microinstruction 601. The microaddress field 515 in the first word 603 also includes an address (herein designated "Label") that is stored into a Jump Target Address First-in-first-out storage device (JTAF) 121. In the exemplary embodiment, the JTAF 121 stores target addresses for conditional jumps in the microcode. When the unroll unit 117 is not activated (i.e., when microinstructions are being fetched from the microcode storage unit 113), all conditional jumps will generate either a "jump taken" signal or a "jump not taken" signal. If the jump is taken, the address at the head of the JTAF 121 is removed from the JTAF 121, and used as an address for fetching a next microinstruction from the microcode storage unit 113. If the jump is not taken, the address stored in the JTAF 121 is not needed. Assertion of the "jump not taken" signal, therefore, causes the address to be removed from the JTAF 121 without being used. The use of the JTAF 121 when the unroll unit 117 is activated will be discussed below with respect to deactivation of the unroll unit 117.

The unroll unit 117 has no need for any other fields in the first word 603 of the three word microinstruction 601, so the word may be discarded from the microcode decoder 107 without generating any control signals for use by the microprocessor hardware resources 111. The second and third words 605, 607 of the three word microinstruction 601 are then retrieved from the microcode storage unit 113, and supplied directly to the unroll unit 117. The second word 605 is stored into the POS 1 register 201, and the third word 607 is stored in to the POS 2 register 203. The assembler to microcode translator 103 then stops retrieving microinstructions from the microcode storage unit 113, and, assuming that the flag has been set to indicate that the UNRCOUNT register 229 has been initialized, causes the unroll unit 117 to begin generating microinstructions, as described above. (In the exemplary embodiment, if the UNRCOUNT register 229 has not yet been initialized at this point, the unroll unit 117 will wait for that initialization to occur.) At this time, the multiplexer 119 is also controlled to route the output of the unroll unit 117 to the microcode decoder 107.

Deactivation of the Unroll Unit 117

As explained above, the unroll unit 117 includes an UNRCOUNT register 229, the contents of which designate a maximum number of microinstructions that will be generated by the unroll unit 117. When the unroll unit 117 has delivered the requested number of microinstructions indicated by the UNRCOUNT register 229, the unroll unit 117 is deactivated, and the assembler to microcode translator 103 resumes fetching microinstructions from the microcode storage unit 113. At this time, the multiplexer 119 is controlled so that the fetched microinstructions will be supplied to the microcode decoder 107.

In yet another aspect of the invention, it is not always necessary for the unroll unit 117 to generate the maximum number of microinstructions indicated in the UNRCOUNT register 229. Instead, the unroll operation can be deactivated by generating a microinstruction that causes a micro jump to be executed. The target address for the micro jump is the Label that was stored in the JTAF 121 when the unroll unit 117 was first activated. In the case of a pipelined machine, any microinstructions that had been delivered to the microcode decoder 107 after the one that caused the micro jump to be taken will be flushed from the pipeline.

To generate the microinstruction that causes a micro jump to be executed, at least one of the POS 1 or POS 2 registers, 201 and 203 (and/or the POS 3 register 205, if the USE POS 3 bit in the POS 2 control register 215 is asserted) should have its MCO field 503 encoded to indicate an operation herein referred to as "[if Cond] interrupt unroll." (The brackets around the words "if Cond" indicate that making the instruction conditional is optional. That is, the Cond field 505 may be encoded to indicate an "always true" condition, so that a branch will always be taken whenever the microinstruction is executed.)

Like other micro jump instructions, the "[if Cond] interrupt unroll" operation generates the "jump taken" signal whenever, upon executing the generated microinstruction, a designated condition is satisfied and the jump is taken in the flow of microprogram execution. As explained above, the "jump taken" signal will flush the Label from the JTAF 121. The "[if Cond] interrupt unroll" operation differs from non-unroll-related micro jump instructions, however, in that it does not generate the "jump not taken" signal if the condition specified in the Cond field 505 is not fulfilled. As a consequence, the Label stored in the JTAF 121 will remain in the JTAF 121. This is necessary to ensure that subsequent generation and execution of the same microinstruction (i.e., one based on the contents of the POS 1 register 201, POS 2 register 203 or POS 3 register 205) will have a corresponding jump target address stored in the JTAF 121.

In a pipelined machine, there can be a time delay between the time of generation of a line of code by the unroll unit 117 and the time that the generated line of code is executed in the microcode decoder 107. As a result of this time delay, any micro jump resulting from execution of an unroll-generated microinstruction can be executed by the microcode decoder 107 after the unroll unit 117 has delivered the maximum number of microinstructions, as specified by the contents of the UNRCOUNT register 229. If such a micro jump is taken, then any next instructions that had been supplied to the microcode decoder by the unroll unit 117 will be flushed, and the pipeline will be reloaded with new microinstructions retrieved from the microcode storage unit 113, beginning at the jump target address.

If conditional micro jumps are included in the sequence of microinstructions generated by the unroll unit 117, but the designated condition is never satisfied, so that the micro jump is not taken by the time the last generated microinstruction is executed, a potential problem exists because the jump target address stored in the JTAF 121 will not be removed. (It will be recalled that the "[if Cond] interrupt unroll" operation only generates a "jump taken signal" when the condition is satisfied; it does not generate a "jump not taken" signal when the condition is not satisfied, so there is no signal for clearing the jump target address from the JTAF 121 under these circumstances.)

To solve this potential problem, steps must be taken to ensure that the Label that is loaded into the JTAF 121 when the unroll unit 117 is first activated, is removed from the JTAF 121 after execution of the last unroll-generated microinstruction, regardless of whether or not a jump is actually taken. In accordance with another aspect of the invention, this is accomplished as follows.

In the exemplary embodiment, the microinstructions stored in the POS 1, POS 2 and POS 3 registers 201, 202 and 203, each have an MC0 field 503 that is either encoded as a "No op" (i.e., no operation) or as an "[if Cond] interrupt unroll" operation, which was described above. Neither of these microcode operations has the possibility of generating a "jump not taken" signal, which would clear an unused jump target address from the JTAF 121. Therefore, another microcode operation is provided, herein referred to as "[if Cond] go to label". This microinstruction, which is typically coded by a microprogrammer when it is expected that a microprogram will be executed out of the microcode storage unit 113, rather than from the unroll unit 117, issues the signal "jump taken" when a designated condition is satisfied, and it also issues the signal "jump not taken" when the designated condition is not satisfied. Thus, in either case, a jump target address stored in the JTAF 121 will be cleared upon execution of the "[if Cond] go to label" instruction.

In accordance with the invention, when a last microinstruction is generated by the unroll unit 117, the MCO field 503 of that last microinstruction is forced, by hardware, to be encoded as an "[if Cond] go to label" operation. If the MCO field 503 of the last microinstruction would otherwise have been a "No op", then the Cond field 505 is set to a value of "always false". This will cause the last microinstruction, when executed, to issue the "jump not taken" signal (thereby clearing the Label from the JTAF 121) without actually taking a micro jump. If, however, the MCO field 503 of the last microinstruction would otherwise have been an "[if Cond] interrupt unroll", then the Cond field 505 of the last microinstruction is left as it was originally encoded by the microprogrammer. This retains the possibility of satisfying the condition and taking the jump when the last microinstruction is executed (which will clear the jump target address from the JTAF 121), but still ensures that, if the jump is not taken, the "jump not taken" signal will be asserted, which will clear the jump target address from the JTAF 121.

A number of examples will now be described, in which an exemplary embodiment of the unroll unit 117 is utilized to implement some common functions that might be associated with assembly language instructions. It will be recognized that, in general, each processor architecture is different. Therefore, the following examples serve only to illustrate the principles involved in utilizing the unroll unit 117. They should not be construed as limiting the scope to which the unroll unit 117 can be applied.

Figure 7A:
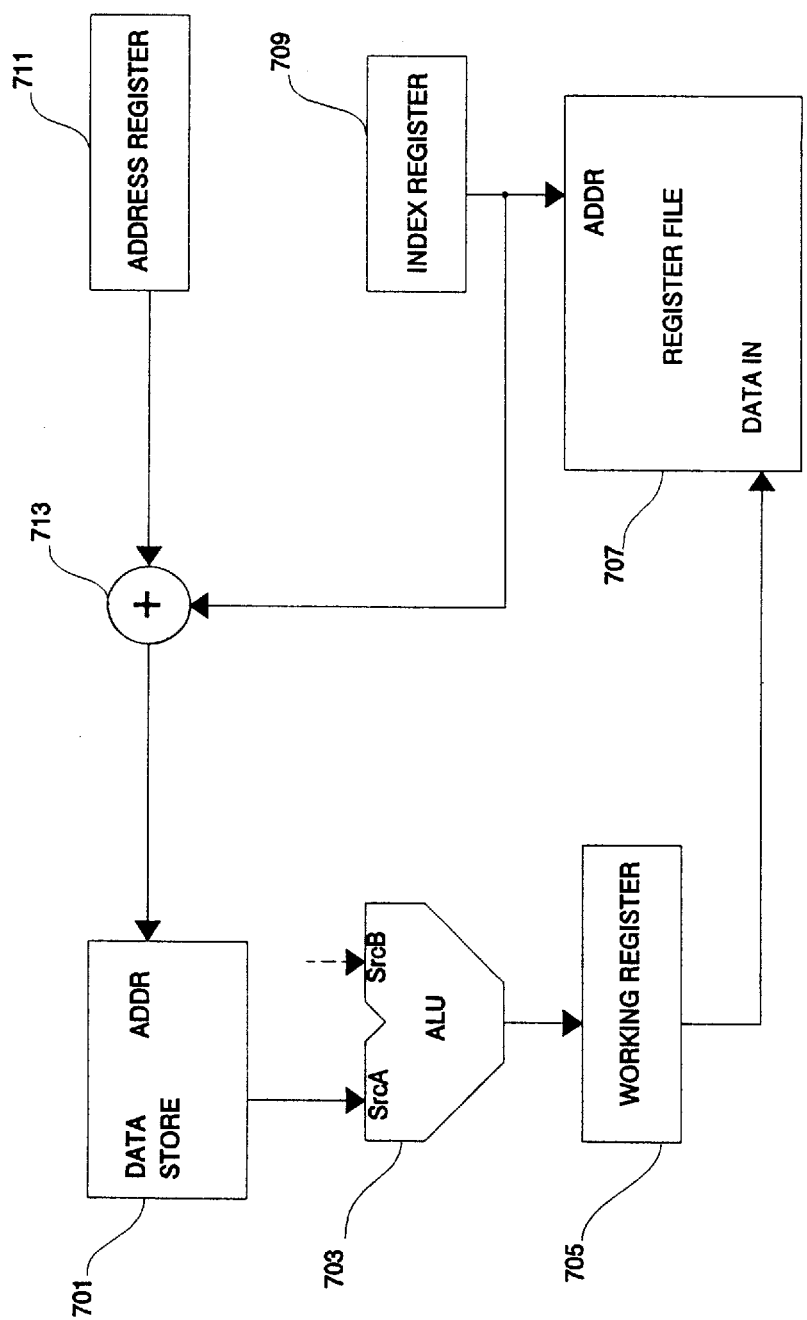
FIGS. 7a and 7b illustrate, respectively, a block diagram of an exemplary processor architecture, and a flowchart for utilizing an unroll unit to perform a data move operation.

A first example will be illustrated with reference to FIGS. 7a and 7b. FIG. 7a illustrates the pertinent components of a computer architecture. These components include an addressable data store 701, whose output supplies data to a SrcA input of an ALU 703. For this example, it is not important what the source of a SrcB operand for the ALU 703 is. The address for the data store 701 is supplied by a summing unit 713, one input of which is supplied by an address register 711, and the other input of which is supplied by an index register 709. The output of the index register 709 also supplies an address for an addressable register file 707.

In this example, it is desired to move a number of data words (henceforth referred to simply as "words") from the data store 701 into the register file 707. It is assumed that the microarchitecture will not allow this transfer to be performed in one microinstruction clock cycle. Instead, in a first microinstruction clock cycle, the data must be supplied by the data store 701, and routed through the ALU 703 so that it can be temporarily stored in a working register 705, which can receive an output of the ALU 705. Then, in a second microinstruction clock cycle, the data may be moved from the working register 705 to the addressed location in the register file 707. If the desired number of words have not yet been moved, a third microinstruction is needed so that the index register 709 may be incremented.

Figure 7B:
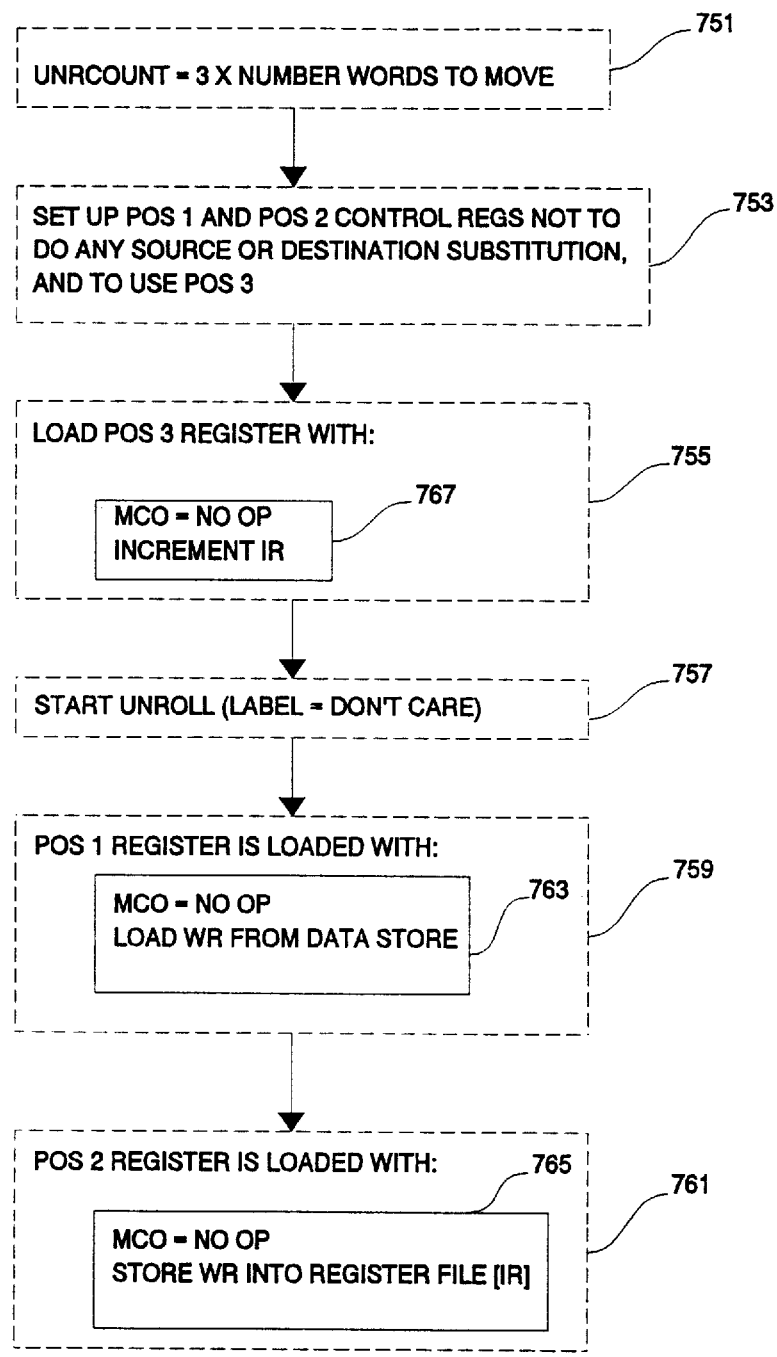

FIG. 7b illustrates a flowchart for performing the above-described "move" operation. In this, as well as in subsequent flowcharts, each block represents one microinstruction. Blocks shown in dotted lines represent microinstructions that are fetched and executed out of the microcode storage unit 113. The blocks shown in solid lines are microinstructions which are generated by the unroll unit 117 in accordance with principles described in detail above.

Beginning with step 751, the UNRCOUNT register 229 is loaded with a count representing three times the number of words to be moved. This is because, as will be seen below, three microinstructions will need to be generated for each one word to be moved. Next, at step 753, the POS 1 and POS 2 control registers 213 and 215 are initialized to ensure that no substitution will occur when the unroll unit 117 is activated. The POS 2 control register 215 is further initialized so that the USE POS 3 bit asserted. This step can be omitted if it is known that the POS 1 and POS 2 control registers 213 and 215 were initialized in this manner by some earlier operation.

Next, at step 755, the POS 3 register 205 is loaded with a value that represents a microinstruction that will do no more than increment the index register 709. It should be recognized that the microinstruction loaded into the POS 3 register 205 is not executed at this time. This does not occur until after the unroll unit 117 is activated. Rather, the step of loading the POS 3 register 205 is merely an initializing step, in preparation for activating the unroll unit 117.

Next, the unroll unit 117 is activated (step 757). Because the routine will not include any branch instructions, the microaddress field 515 of this microinstruction need not be initialized to anything in particular. As described earlier, the next two microinstructions are then fetched from the microcode storage unit 113 and loaded into the POS 1 register 201 and the POS 2 register, respectively (steps 759 and 761). The POS 1 register 201 therefore will contain a microinstruction that reads the addressed location of the data store 701, routes this data through the ALU 703, and loads it into the working register 705.

The POS 2 register will contain a microinstruction that stores the contents of the working register 705 into the addressed location of the register file 707.

The unroll unit 117 then begins generating microinstructions that are supplied to the microcode decoder 107 for execution. The first two generated microinstructions are based on the POS 1 and POS 2 registers 201 and 203. The third microinstruction to be generated is based on the POS 3 register 205 because the USE POS 3 bit in the POS 2 control register 215 has been asserted. The fourth generated microinstruction will again be based on the contents of the POS 1 register 201, and the pattern repeats. With each generated microinstruction, the contents of the UNRCOUNT register 229 are decremented, and the unroll unit 117 is deactivated when the contents of the UNRCOUNT register 229 go to zero, as described in detail above.

The effect of the generated microinstructions is a repetitive three-step operation in which the working register is first loaded from the addressed location of the data store (step 763), the addressed location of the register file 707 is loaded from the working register 705 (step 765), and the index register 709 is incremented (step 767). This pattern repeats until the number of requested microinstructions (as designated by the initial contents of the UNRCOUNT register 229) has been generated.

It will be observed that the generated sequence of microinstructions does not contain any branch instructions. Consequently, any pipeline in the microcode decoder 107 can continue executing without having to be flushed and reloaded for the purpose of performing a loop.

Figure 8A:
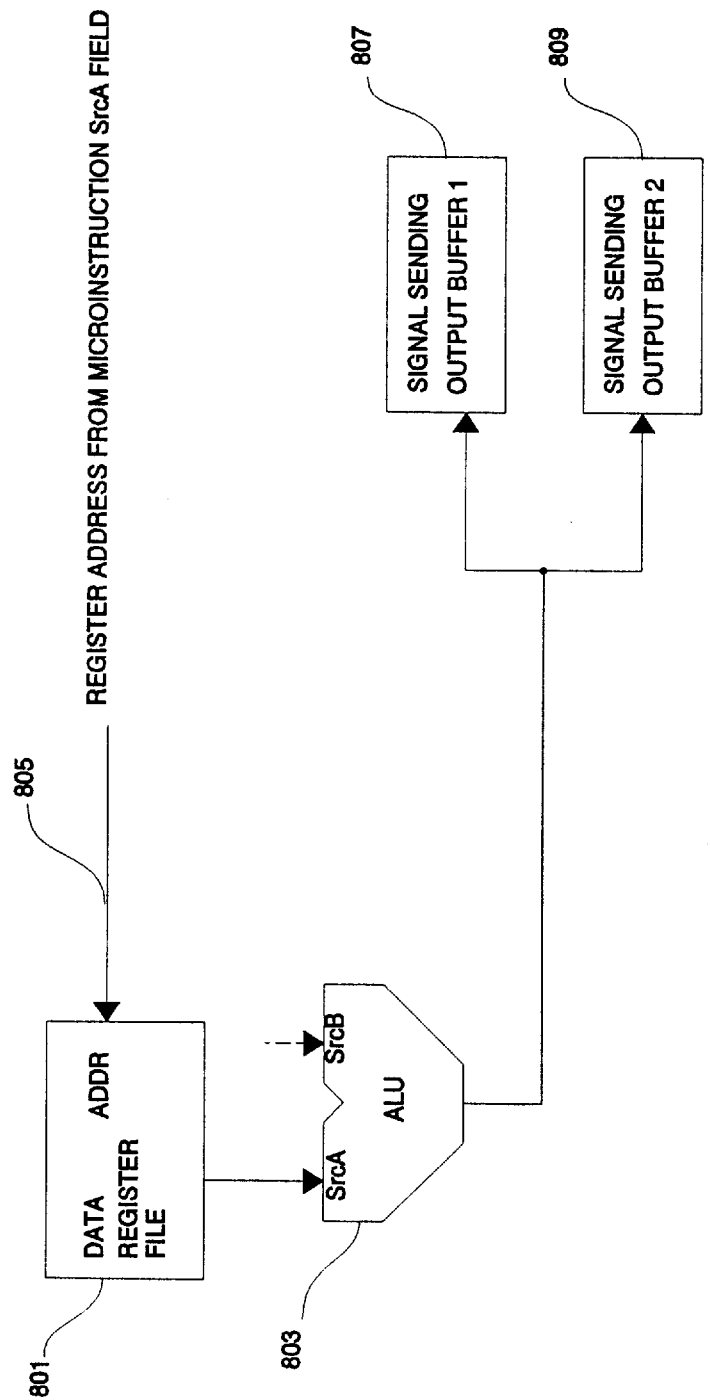
FIGS. 8a and 8b illustrate, respectively, a block diagram of an exemplary processor architecture, and a flowchart for utilizing an unroll unit to perform a data transfer operation.

A second example will now be described with reference to FIGS. 8a and 8b. FIG. 8a illustrates the pertinent components of a computer architecture. These components include an addressable data register file 801, whose output supplies data to a SrcA input of an ALU 803. For this example, it is not important what the source of a SrcB operand for the ALU 803 is. The address 805 for the data register file 801 is supplied by a SrcA field from an executing microinstruction.

In this example, it is desired to supply a number of words from the data register file 801 alternately to first and second signal sending output buffers 807 and 809, respectively.

Figure 8B:
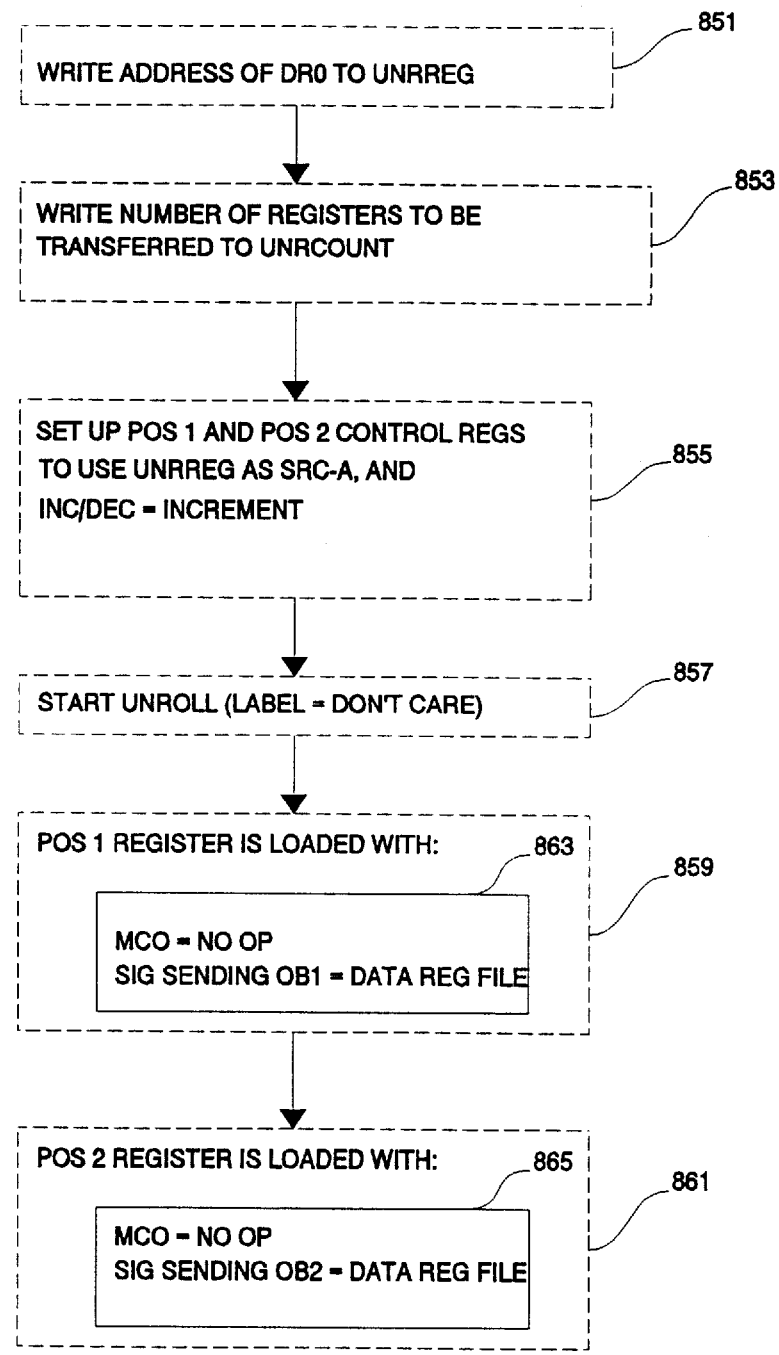

FIG. 8b illustrates a flowchart for performing the above-described "transfer" operation. Beginning with step 851, the address of the first data register in the data register file 801 is written into the UNRREG 207. Then, the number of registers to be transferred are loaded into the UNRCOUNT register 229 (step 853). This count derives from the fact that, as will be seen below, one microinstruction is needed for each word to be transferred. Next, at step 855, the POS 1 and POS 2 control registers 213 and 215 are each initialized to designate that the contents of the UNRREG 207 will be substituted for all microinstructions based on the POS 1 register 201 and the POS 2 register 203. Also, in each of the POS 1 and POS 2 control registers 213 and 215, the INC/DEC bit is set to "increment". Because only one substitution will be performed for each generated microinstruction, there is no need to assert the I/D 1:ST bit. In the POS 2 control register 215, the USE POS 3 bit is not asserted, since it is not desired to generate any microinstructions based on the contents of the POS 3 register 205.

Next, the unroll unit 117 is activated (step 857). Because the routine will not include any branch instructions, the microaddress field 515 of this microinstruction need not be initialized to anything in particular. As described earlier, the next two microinstructions are then fetched from the microcode storage unit 113 and loaded into the POS 1 register 201 and the POS 2 register, respectively (steps 857 and 859). The POS 1 register 201 therefore will contain a microinstruction that reads the addressed location of the data register file 801, routes this data through the ALU 803, and loads it into the first signal sending output buffer 807.

The POS 2 register will contain a microinstruction that reads the addressed location of the data register file 801, routes this data through the ALU 803, and loads it into the second signal sending output buffer 809.

The unroll unit 117 then begins generating microinstructions that are supplied to the microcode decoder 107 for execution. The first two generated microinstructions are based on the POS 1 and POS 2 registers 201 and 203. The third microinstruction to be generated is again based on the POS 1 register 201 because the USE POS 3 bit in the POS 2 control register 215 has not been asserted. The pattern then repeats. With each generated microinstruction, the contents of the UNRCOUNT register 229 are decremented. Also, with each generated microinstruction that utilizes substitution (in this case, all of them), the UNRREG 207 is incremented, so that successive addresses will be substituted for successively generated microinstructions. The unroll unit 117 is deactivated when the contents of the UNRCOUNT register 229 go to zero, as described in detail above.

The effect of the generated microinstructions is a repetitive two-step operation in which the first signal sending output buffer 807 is first loaded from the addressed location of the data register file 801 (step 863) and the second signal sending output buffer 809 is loaded from the next addressed location (which is one more than the previously addressed location because the UNRREG 207 has been incremented) of the data register file 801 (step 865). This pattern repeats until the number of requested microinstructions (as designated by the initial contents of the UNRCOUNT register 229) has been generated.

It will be observed that, again, the generated sequence of microinstructions does not contain any branch instructions. Consequently, any pipeline in the microcode decoder 107 can continue executing without having to be flushed and reloaded for the purpose of performing a loop.

Figure 9A:
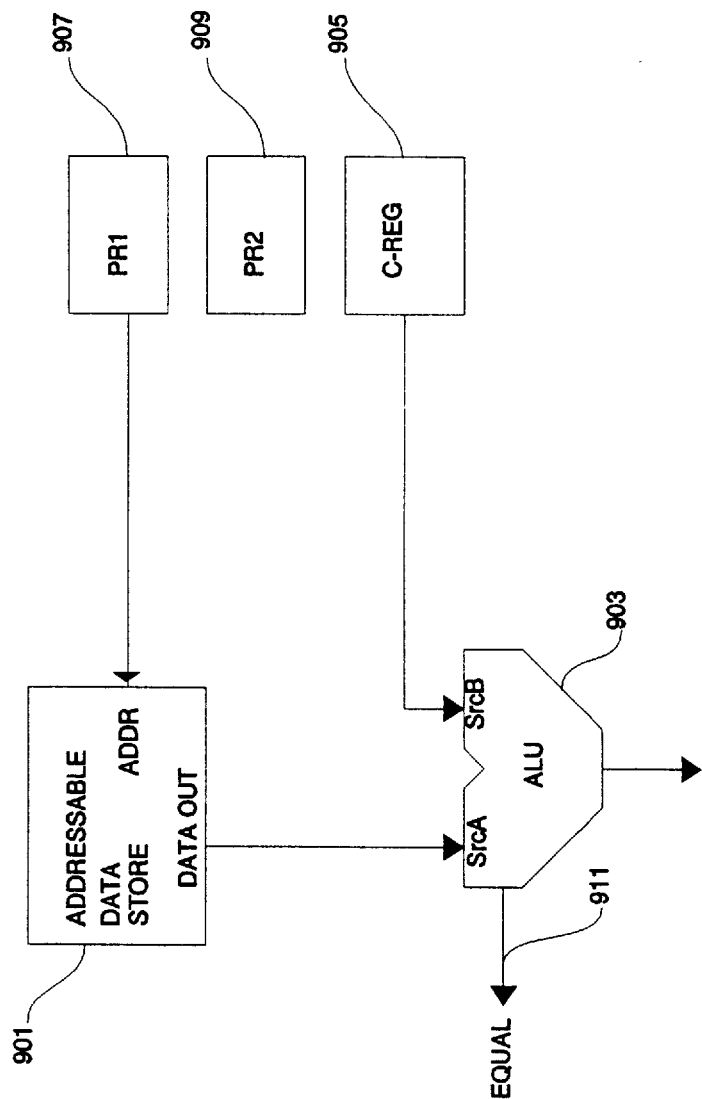
FIGS. 9a and 9b illustrate, respectively, a block diagram of an exemplary processor architecture, and a flowchart for utilizing an unroll unit to perform a data search operation.

A third example will now be described with reference to FIGS. 9a and 9b. FIG. 9a illustrates the pertinent components of a computer architecture. These components include an addressable data store 901, whose output supplies data to a SrcA input of an ALU 903. A SrcB input of the ALU 903 can be supplied with an operand by a comparison register (C-reg) 905. The address for the data store 901 is supplied by a first pointer register (PR1) 907.

In this example, it is desired to search for equality between a number of variables stored at sequential locations of the addressable data store 901 and the contents of the C-reg 905. The contents of PR1 907 are to contain the address of the first location in the data store 901 to be compared. After a match is found, the relevant pointer value is retained in PR1 907, and a micro jump to a location, "FOUND IT", is to take place. If no match is found, the contents of PR1 907 are to be decreased by one, the test repeated. The contents of a second pointer register (PR2) indicate the address of the last location in the data store 901 to be compared.

Figure 9B:
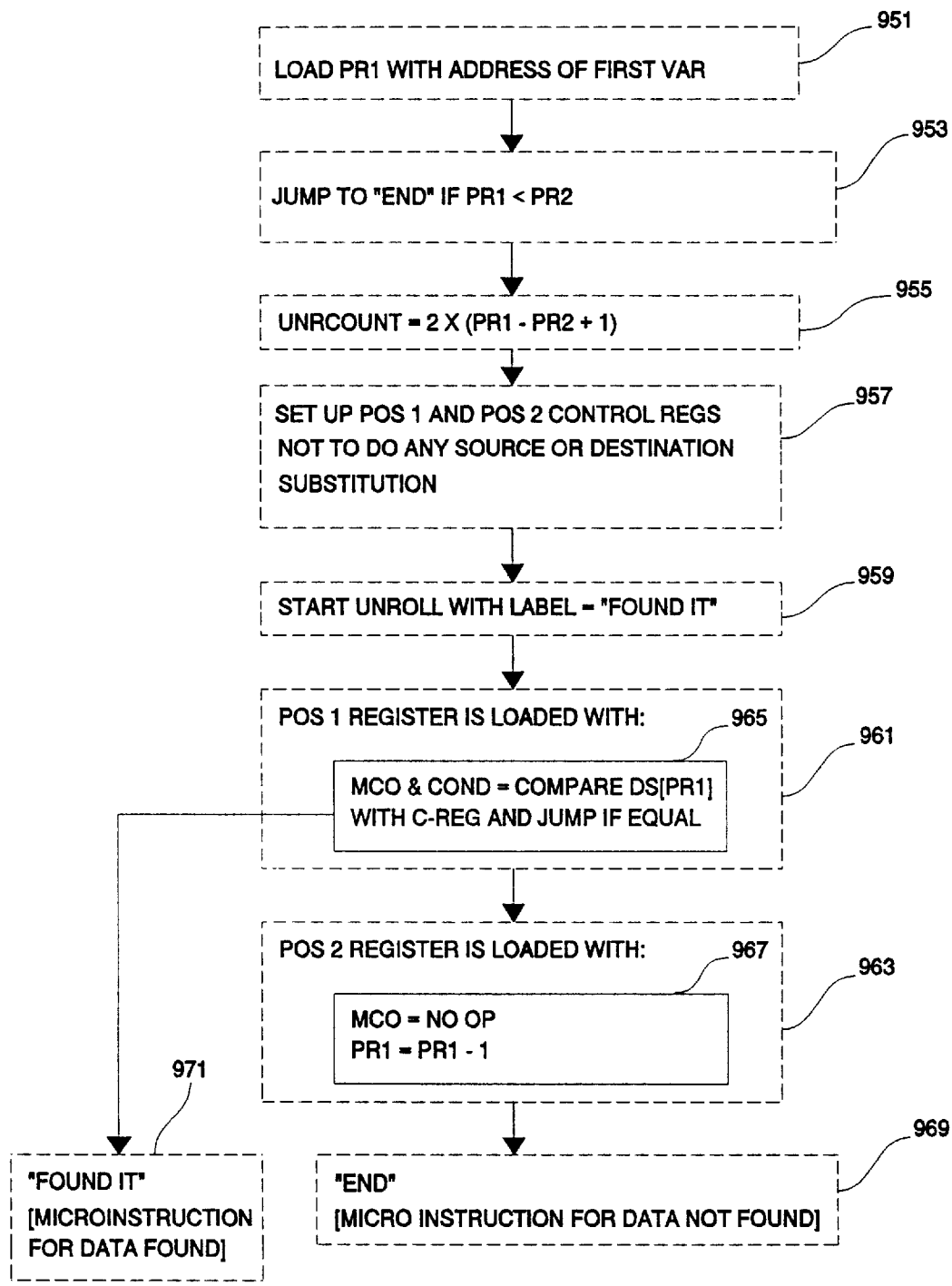

FIG. 9b illustrates a flowchart for performing the above-described "search" operation. Beginning with step 951, the address of the first location to be compared is written into PR1 907. In order to make sure that the contents of PR1 907 are initialized properly, a conditional micro jump instruction is executed, whereby a jump to the address indicated by the label "END" is performed if the contents of PR1 907 are less than the contents of PR2 909 (step 953). Then, the UNRCOUNT register 229 is loaded with the quantity 2×(PR1−PR2+1), where (PR1−PR2+1) represents the maximum number of words to be searched, and the factor of 2 derives from the fact that a maximum of two microinstructions will need to be generated for each one search that is performed. Next, at step 957, the POS 1 and POS 2 control registers 213 and 215 are each initialized to designate that no substitution of source or destination fields will occur for microinstructions based on either of the POS 1 or POS 2 registers, 201 and 203. In the POS 2 control register 215, the USE POS 3 bit is not asserted, since it is not desired to generate any microinstructions based on the contents of the POS 3 register 205.

After being initialized as described above, the unroll unit 117 is then activated (step 959). Because the routine will include a branch instructions, the microaddress field 515 of this microinstruction should be set equal to the label "FOUND IT". As described earlier, the next two microinstructions are then fetched from the microcode storage unit 113 and loaded into the POS 1 register 201 and the POS 2 register, respectively (steps 961 and 963). In this case, the POS 1 register 201 will contain a microinstruction that reads the addressed location (based on the contents of PR1 907) of the data store 901, and routes this data to the SrcA input of the ALU 903. This same microinstruction also routes the contents of the C-reg 905 to the SrcB input of the ALU 903, and causes the ALU to perform a compare operation. This same microinstruction further specifies that a micro jump is to occur if the EQUAL indicator 911 of the ALU is asserted.

The POS 2 register will contain a microinstruction that decrements the PR1 907, in preparation for a next comparison.

The unroll unit 117 then begins generating microinstructions that are supplied to the microcode decoder 107 for execution. The first two generated microinstructions are based on the POS 1 and POS 2 registers 201 and 203. The third microinstruction to be generated is again based on the POS 1 register 201 because the USE POS 3 bit in the POS 2 control register 215 has not been asserted. The pattern then repeats. With each generated microinstruction, the contents of the UNRCOUNT register 229 are decremented. The unroll unit 117 will be deactivated no later than when the contents of the UNRCOUNT register 229 go to zero, as described in detail above.

The effect of the generated microinstructions is a repetitive two-step operation in which, first, the addressed location of the data store 901 is compared with the contents of the C-reg 905 (step 965), and a conditional jump is performed. If a match occurs, the unroll unit 117 will be deactivated as a result of a micro jump to the address stored in the JTAF 121. In this case, the address is designated by the label "FOUND IT", and microinstructions for performing desired operations when a match occurs would be executed out of the microcode storage unit 113 (step 971). If no match was found (EQUAL indicator 911 not asserted), then the second microinstruction is generated and executed, which decrements the contents of PR1 907 in preparation for the next comparison operation. In the event that no match is ever found, this pattern will be repeated until the number of requested microinstructions (as designated by the initial contents of the UNRCOUNT register 229) has been generated, at which point the unroll unit 117 will be deactivated, and the next instruction fetched from the microcode storage unit 113 and executed (step 969).

It will be observed that, so long as no match is found, the generated sequence of microinstructions does not contain any branch instructions that are actually performed. Consequently, any pipeline in the microcode decoder 107 can continue executing without having to be flushed and reloaded for the purpose of performing a loop.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. An unroll apparatus for generating instructions for controlling a processor, the unroll apparatus comprising:
   a first template storage means for storing a first template instruction;
   a counter;
   generating means for generating a number of instructions, wherein each generated instruction is based on the first template instruction;
   means for adjusting the counter to indicate the number of instructions that have been generated by the generating means; and
   means for deactivating the generating means in response to the counter indicating that a predetermined number of instructions have been generated.

2. The unroll apparatus of claim 1, further comprising:
   means for supplying the generated instructions to the processor when the unroll apparatus is activated, and for supplying instructions received from an alternative instruction source to the processor when the unroll apparatus is not activated.

3. The unroll apparatus of claim 1, further comprising:
   a substitute field storage means for storing a substitute address field, and wherein the generating means generates each generated instruction by substituting the substitute address field in place of an address field in the first template instruction.

4. The unroll apparatus of claim 3, further comprising:
   means for adjusting the substitute address field in the substitute field storage means after generating each instruction.

5. The unroll apparatus of claim 3, further comprising:
   means for storing a substitution control signal;
   wherein the generating means substitutes the substitute address field in place of an address field in the first template instruction only if the substitution control signal is asserted.

6. The unroll apparatus of claim 1, further comprising:
   means for receiving a signal that indicates satisfaction of a condition; and
   means for deactivating the generating means in response to assertion of the signal that indicates satisfaction of the condition.

7. An unroll apparatus for generating instructions for controlling a processor, the unroll apparatus comprising:
   a first template storage means for storing a first template instruction;
   a second template storage means for storing a second template instruction;
   a counter;
   generating means for generating a number of instructions including a first instruction based on the first template instruction and a second instruction based on the second template instruction;
   means for repeatedly operating the generating means;
   means for adjusting the counter to indicate a number of instructions that have been generated by the generating means; and
   means for deactivating the generating means in response to the counter indicating that a predetermined number of instructions have been generated.

8. The unroll apparatus of claim 7, further comprising:
   means for supplying the generated instructions to the processor when the unroll apparatus is activated, and for supplying instructions received from an alternative instruction source to the processor when the unroll apparatus is not activated.

9. The unroll apparatus of claim 7, further comprising:
   a substitute field storage means for storing a substitute address field, and
   wherein the generating means generates each first instruction by substituting the substitute address field in place of an address field in the first template instruction.

10. The unroll apparatus of claim 9, further comprising:
    means for adjusting the substitute address field in the substitute field storage means after generating each first instruction.

11. The unroll apparatus of claim 9, further comprising:
    means for storing a first substitution control signal;
    wherein the generating means substitutes the substitute address field in place of an address field in the first template instruction only if the first substitution control signal is asserted.

12. The unroll apparatus of claim 9, wherein:
    the generating means generates each second instruction by substituting the substitute address field in place of an address field in the second template instruction.

13. The unroll apparatus of claim 12, further comprising:

means for adjusting the substitute address field in the substitute field storage means after generating each first instruction; and means for adjusting the substitute address field in the substitute field storage means after generating each second instruction.

14. The unroll apparatus of claim 12, further comprising:

means for storing a first substitution control signal; and means for storing a second substitution control signal, wherein the generating means substitutes the substitute address field in place of an address field in the first template instruction only if the first substitution control signal is asserted, and wherein the generating means substitutes the substitute address field in place of an address field in the second template instruction only if the second substitution control signal is asserted.

15. The unroll apparatus of claim 7, further comprising:

means for receiving a signal that indicates satisfaction of a condition; and means for deactivating the generating means in response to assertion of the signal that indicates satisfaction of the condition.

16. A method for generating instructions for controlling a processor, the method comprising the steps of:

storing a first template instruction;

using a generating apparatus to generate a predetermined number of instructions, wherein each generated instruction is based on the first template instruction.

17. The method of claim 16, further comprising the steps of:

supplying the generated instructions to the processor when the generating apparatus is activated; and supplying instructions received from an alternative instruction source to the processor when the generating apparatus is not activated.

18. The method of claim 16, further comprising the step of:

storing a substitute address field, and wherein the step of generating each instruction includes substituting the substitute address field in place of an address field in the first template instruction.

19. The method of claim 18, further comprising the step of:

adjusting the stored substitute address field after generating each instruction.

20. The method of claim 18, further comprising the step of:

storing a substitution control signal, wherein the step of generating each instruction includes substituting the substitute address field in place of an address field in the first template instruction only if the substitution control signal is asserted.

21. The method of claim 16, further comprising the step of:

deactivating the generating apparatus prior to generating the predetermined number of instructions in response to detection that a predetermined condition has been satisfied.

22. A method for generating instructions for controlling a processor, the method comprising the steps of:

storing a first template instruction;

storing a second template instruction;

using a generating apparatus to generate a number of instructions including a first instruction based on the first template instruction and a second instruction based on the second template instruction;

repeatedly using the generating apparatus until a predetermined number of instructions have been generated.

23. The method of claim 22, further comprising:

supplying the generated instructions to the processor when the generating apparatus is activated; and supplying instructions received from an alternative instruction source to the processor when the generating apparatus is not activated.

24. The method of claim 22, further comprising:

storing a substitute address field, and wherein the generating apparatus performs the step of substituting the substitute address field in place of an address field in the first template instruction.

25. The method of claim 24, further comprising the step of:

adjusting the stored substitute address field after generating each first instruction.

26. The method of claim 24, further comprising the step of:

storing a first substitution control signal;

wherein the generating apparatus performs the step of substituting the substitute address field in place of an address field in the first template instruction only if the first substitution control signal is asserted.

27. The method of claim 24, wherein:

the generating apparatus performs the step of generating each second instruction by substituting the substitute address field in place of an address field in the second template instruction.

28. The method of claim 27, further comprising the steps of:

adjusting the stored substitute address field after generating each first instruction; and adjusting the stored substitute address field after generating each second instruction.

29. The method of claim 27, further comprising the steps of:

storing a first substitution control signal; and storing a second substitution control signal, wherein the generating apparatus performs the step of substituting the substitute address field in place of an address field in the first template instruction only if the first substitution control signal is asserted, and wherein the generating apparatus performs the step of substituting the substitute address field in place of an address field in the second template instruction only if the second substitution control signal is asserted.

30. The method of claim 22, further comprising the step of:

deactivating the generating apparatus prior to generating the predetermined number of instructions in response to detection that a predetermined condition has been satisfied.

* * * * *